(12) United States Patent
Kubota et al.

(10) Patent No.: US 6,338,506 B1
(45) Date of Patent: Jan. 15, 2002

(54) EVAPORATION VALVE PIPE-FASTENING STRUCTURE

(75) Inventors: Kenichi Kubota; Jun Takahashi, both of Morioka (JP)

(73) Assignee: Mikuni Adec Corporation (JP)

( * ) Notice: Subject to any disclaimer, the term of this patent is extended or adjusted under 35 U.S.C. 154(b) by 0 days.

(21) Appl. No.: 09/531,428

(22) Filed: Mar. 20, 2000

(30) Foreign Application Priority Data

May 17, 1999 (JP) .......................................... 11-135663

(51) Int. Cl.[7] ................................................ F16L 39/00
(52) U.S. Cl. ...................................... 285/319; 285/322
(58) Field of Search ................................ 285/319, 322, 285/323

(56) References Cited

U.S. PATENT DOCUMENTS

| | | | | |
|---|---|---|---|---|
| 5,540,463 A | * | 7/1996 | Potokar | 285/319 |
| 5,626,371 A | * | 5/1997 | Bartholomew | 285/319 |
| 5,711,550 A | * | 1/1998 | Brandt | 285/319 X |
| 5,779,284 A | * | 7/1998 | Guest | 285/322 |
| 6,173,999 B1 | * | 1/2001 | Guest | 285/323 |

* cited by examiner

Primary Examiner—Robert J Oberleitner
Assistant Examiner—Melanie Torres
(74) Attorney, Agent, or Firm—Lorusso & Loud (57) ABSTRACT

A pipe-fastening structure for an evaporation valve having a housing and a gas extraction path formed within the housing comprises a cylindrical connecting member, fixed to the housing, with first engaging portion and an inner space, a stopper member having a cylindrical inner member and second engaging portion engaging with the first engaging portion in two stages, a variable member, formed at part of the inner member in a cylindrical shape with a diameter capable of enlargement, channels formed at the inner wall of the variable member, a pipe for connecting evaporation valves and a large diameter bulge section formed in the vicinity of an end of the pipe. Locations of the inner member other than the variable member fit closely with the cylindrical inner wall of the connecting member and the first and second engaging portions undergo first stage engagement.

15 Claims, 6 Drawing Sheets

EVAPORATION VALVE PIPE-FASTENING STRUCTURE

BACKGROUND OF THE INVENTION

1. Field of the Invention

The present invention relates to an evaporation valve pipe fastening structure for preventing a pipe connecting evaporation valves from coming away from the valves.

2. Description of the Related Art

Conventionally, evaporation valves have been employed to prevent vapor within a fuel tank being discharged to outside and to prevent fuel within the fuel tank from flowing to outside. There has, however, been a tendency to provide such evaporation valves within fuel tanks, to take into consideration safety aspects at the time of vehicle collisions and to make the overall structure smaller. When a plurality of evaporation valves are provided within a related fuel tank, each evaporation valve is fixed to the inner wall of the fuel tank using a bracket and pipes connecting the evaporation valves are attached right next to the evaporation valves. There is therefore almost no fear of the pipes coming away and no problem regarding the force required to pull the pipes away.

However, recently, upper surfaces of fuel tanks have become complex in shape and there are therefore cases where connecting pipes cannot be connected directly next to the evaporation valves. There are also cases where connecting pipes are vertically attached at a lower side of a two-way valve when evaporation valves are connected to such valves. There are therefore cases where pipes may come away in a downward direction with the related art where pipes are attached transversely. It is therefore necessary to fix such pipes to the fuel tank using a supporting bracket when there is a possibility that a pipe may come away from the fuel tank in a downward direction.

SUMMARY OF THE INVENTION

As the present invention sets out to resolve the aforementioned points, it is the object of the present invention to provide a pipe fastening structure where a pipe is resistant to a large pulling force and will not come away even when it is attached at the lower side of an evaporation valve in a direction pointing straight downwards.

In order to achieve the aforementioned object, in the present invention, a pipe-fastening structure for an evaporation valve having a housing and a gas extraction path formed within the housing comprises a cylindrical connecting member, a stopper member, a variable member, channels, a pipe, and a large diameter bulge section. The cylindrical connecting member is fixed to the housing and has first engaging means formed at an outer wall and an inner space communicating with the gas extraction path. The stopper member has a cylindrical inner member and second engaging means engaging with the first engaging means in two stages, closely fitting with the inner and outer walls of the cylindrical connecting member. The variable member is formed at part of the inner member in a cylindrical shape with a diameter capable of enlargement. The channels are formed in the same circumferential direction at the inner wall of the variable member at a position midway in the axial direction. The pipe is for connecting evaporation valves. The large diameter bulge section is formed in the vicinity of an end of the pipe. Locations of the inner member other than the variable member fit closely with the cylindrical inner wall of the connecting member and the first and second engaging means undergo first stage engagement. The pipe and the stopper member are then moved with respect to the connecting member, the variable member fits closely with the inner wall of the connecting member, and the first and second engaging means undergo second stage engagement.

The connecting member can be fixed to the housing using fixing means formed separately from the housing, or can be formed integrally with the housing.

The variable member can comprise a multiplicity of arms and slits formed between the arms.

In the present invention, when the first and second engaging means undergo the first stage engagement and the second stage engagement, engagement is not released even if the stopper member is subjected to external force in a direction opposite to a direction of attachment of the stopper member.

The first engaging means can also comprise of a first raised portion, a first recess, a second raised portion and a second recess, formed in that order in the axial direction at the outer wall of the connecting member, and the second engaging means can be an engaging claw.

According to the evaporation valve pipe fastening structure of the present invention, a housing, connecting member in a fixed state, and a pipe are attached via a stopper member. The stopper member is provided in such a manner that it is not possible to pull the stopper member away from the connecting member, and it is ensured that the pipe cannot be drawn away from the evaporation valve by ensuring that the pipe attached to the stopper member cannot be pulled away from the stopper member. As a result, the pipe will not come away from the evaporation valve even if the pipe is attached at a position directly below the evaporation valve.

The pipe can therefore also be arranged directly below the evaporation valve in an economic manner because the use of a supporting bracket to support the pipe is no longer necessary as there is no fear of the pipe coming away from the evaporation valve.

DETAILED DESCRIPTION OF THE PREFERRED EMBODIMENT

The following is a description of the present invention based on the drawings.

Figure 1:
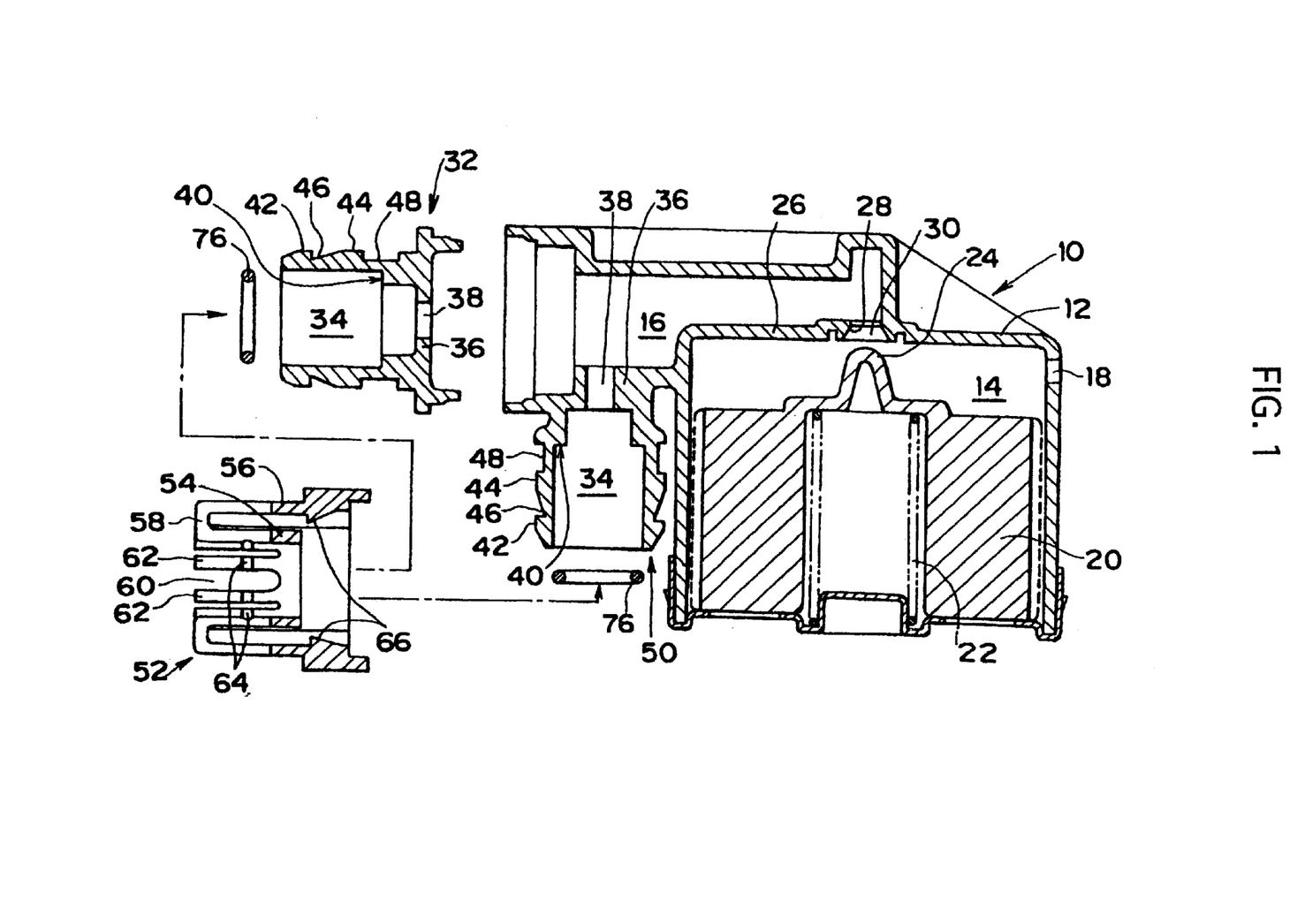
FIG. 1 is a cross-sectional view showing an embodiment of an evaporation valve pipe fastening structure of the present invention.
Figure 2:
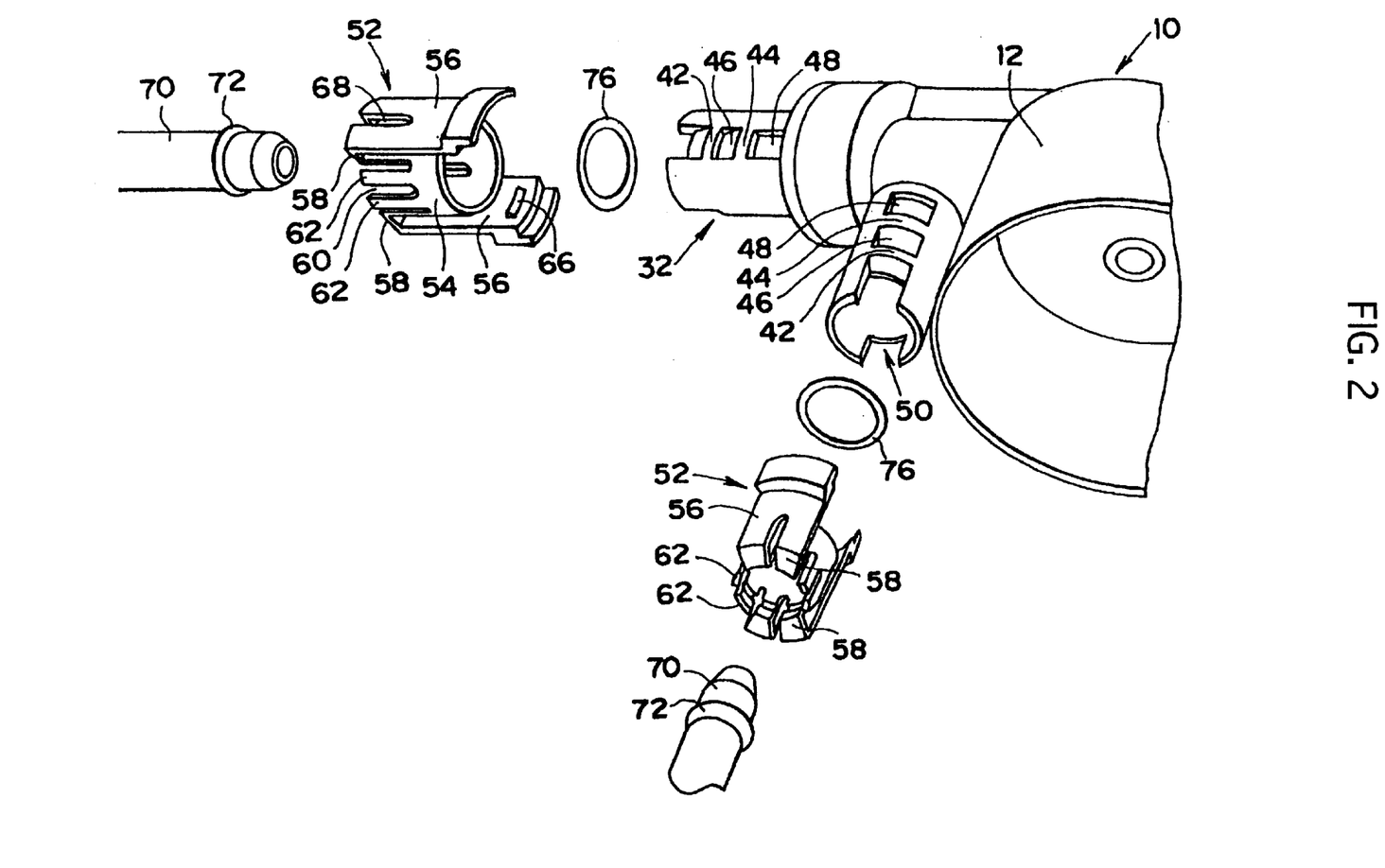
FIG. 2 is an exploded perspective view of the essential parts of FIG. 1.

FIG. 1 is a cross-sectional view showing an embodiment of an evaporation valve pipe-fastening structure of the present invention and FIG. 2 is an exploded perspective view of the essential parts of FIG. 1.

As shown in FIG. 1, an evaporation valve 10 comprises a housing 12, a space 14 formed in the lower part of the housing 12, a gas extraction path 16 formed in the upper part of the housing 12 and opening to outside, a gas introduction hole 18 formed in the housing 12 and connecting the upper part of the space 14 and the outside of the housing 12, a float 20 capable of moving vertically within the space 14, a spring 22 for urging the float 20 upwards, a valve 24 formed at the center of the upper surface of the float 20, a partition 26 defining the space 14 and the gas extraction path 16, a valve seat 28 formed on the side of the partition 26 on the side of the space 14, and a connecting path 30 formed positioned at the center of the valve seat 28 and connecting the space 14 and the gas extraction path 16.

The foregoing evaporation valve 10 is well-known in the related art. When the float 20 is positioned at the bottom with no fuel flowing within the housing 12, fuel gas is expelled through the gas extraction path 16 so that when fuel flows into the space 14 of the housing 12 so that the float 20 floats, the valve 24 closes the valve seat 28 and the flow of fuel into the gas extraction path 16 is prevented.

A cylindrical connecting member 32, that is separate from the housing 12, is fixed to the opening of the gas extraction path 16 using a well-known fixing method or fixing means such as fusing. An inner space 34 for communicating with the gas extraction path 16 is formed within this cylindrical connecting member 32. A stopper wall 36 is formed at an end of the inner space 34 at the side that communicates with the gas extraction path 16 so as to project inwards from the inner part of the inner space 34, and a hole 38 communicating with the gas extraction path 16 and the inner space 34 is formed at the center of the stopper wall 36. A step 40 is also formed midway in the axial direction of the inner space 34. This step 40 is set so that the inner diameter of the inner wall on the side of the stopper wall 36 is relatively small near the step 40.

A first raised portion 42 is formed at the outer wall of the connecting member 32 at the side far from the stopper wall 36 and a second raised portion 44 is formed next to the first raised portion 42 at the side close to the stopper wall 36. A first recess 46 is formed between the first raised portion 42 and the second raised portion 44 and a second recess 48 is formed on the opposite side from the first recess so as to sandwich the second raised portion 44. The first raised portion 42, second raised portion 44, first recess 46 and second recess 48 constitute a first engaging means. This first engaging means is formed at two locations at the top and bottom as shown in FIG. 1 and FIG. 2 but can also be formed about the entire periphery of the outer wall of the connecting member 32, and is by no means limited to this shape.

In this description, the cylindrical connecting member 32 is formed separately from the housing 12 but can also be formed integrally with the housing 12. A case where the connecting member 32 is integrally formed with the housing 12 is shown as a connecting member 50 in FIG. 1. This connecting member 50 has the same configuration as the connecting member 32, differing only in that the stopper wall 36 of the connecting member 32 is formed integrally with the housing 12, i.e. the connecting member 50 has the inner space 34 formed within, has the stopper wall 36 as a partition, for the inner space 34 and the gas extraction path 16, and has a hole 38 at the center of the stopper wall 36, for communicating between the gas extraction path 16 and the inner space 34. The step 40 is also formed midway in the axial direction of the inner space 34. The first raised portion 42, first recess 46, second raised portion 44 and second recess 48 are formed at the outer wall of the cylindrical connecting member 50, in that order.

In the present invention, stopper member 52 separate to the connecting member 32 and the connecting member 50 are used for attachment. A stopper 52 comprises an inner member 54, the outer wall of which fits within the inner wall of the cylindrical connecting member 32 or connecting member 50, two or more outer members 56 positioned at the outer walls of the cylindrical connecting member 32 and connecting member 50, and a connecting section 58 for connecting one end of the inner member 54 and one end of the outer member 56. The outer wall of the cylindrical inner member 54 is set so as to fit with the inner wall of the connecting member 32.

The inner member 54 is in contact with the outer members 56 in the circumferential direction at a position far away from the connecting section 58 but is not in contact with the outer members 56 at a position close to the connecting section 58, i.e. a multiplicity of slits 60 are formed in the axial direction at the inner member 54 from a position midway in the axial direction to the position of the connecting section 58, with arm sections 62 being formed between pairs of these slits 60.

One or two of the arm sections 62 of the large number of arm sections 62 of the inner member 54 and the connecting section 58 are formed in an integral manner. A cylindrical section formed by the multiplicity of arm sections 62 is a discontinuous cylinder and can therefore have its internal diameter enlarged by the application of external pressure because the side of the connecting section 58 of the inner member 54 is formed of a multiplicity of slits 60 and arm sections 62. A variable member can therefore be formed by changing the outer shape using the slits 60 and the arm sections 62. Channels 64 are also formed at the inner walls at a midway position in the axial direction of each of the arm sections 62.

At the outer member 56, the opposite side of the connecting section 58 is a free end and this free end extends outwards past the end of the inner member 54. Engaging claws 66 are integrally formed as second engaging means for engaging the first recess 46 and the second recess 48 at the wall surface at the inner side of the outer member 56 exceeding the end of the inner member 54. The structure of the second engaging means is by no means limited to the engaging claws 66. Slits 68 (FIG. 2) are also formed in the same direction as the slits 60 of the inner member 54 at the outer member 56 at a position from midway in the axial direction to the position of the connecting section 58.

A bulge of a large diameter is formed near the end of a pipe 70 connecting evaporation valves 10. The outer diameter of a bulge 72 is set to be larger than the inner diameter of the inner wall of the discontinuous cylinder formed by the large number of arm sections 62 of the inner member 54. The inner diameter of the channels 64 of the discontinuous cylinder shape formed by the large number of arm sections is also set to be of such a size that the bulge 72 of the pipe 70 fits exactly into the channels 64.

The following is a description of the order of assembly of the present invention.

Figure 3:
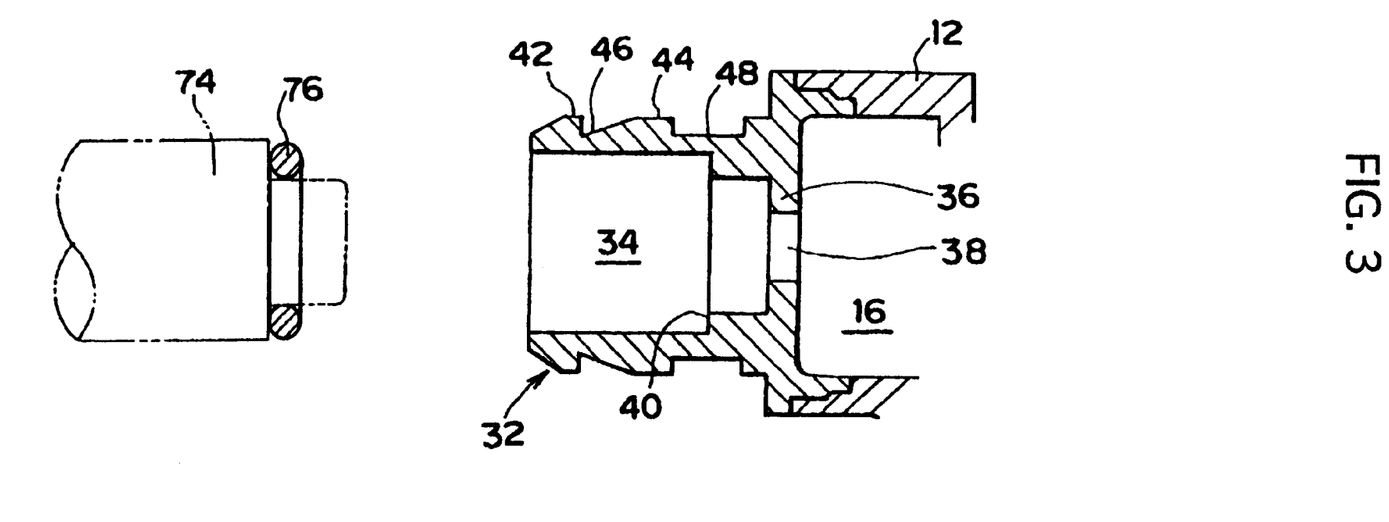
FIG. 3 is a cross-sectional view showing a connecting member used in the present invention with an O-ring installed.
Figure 4:
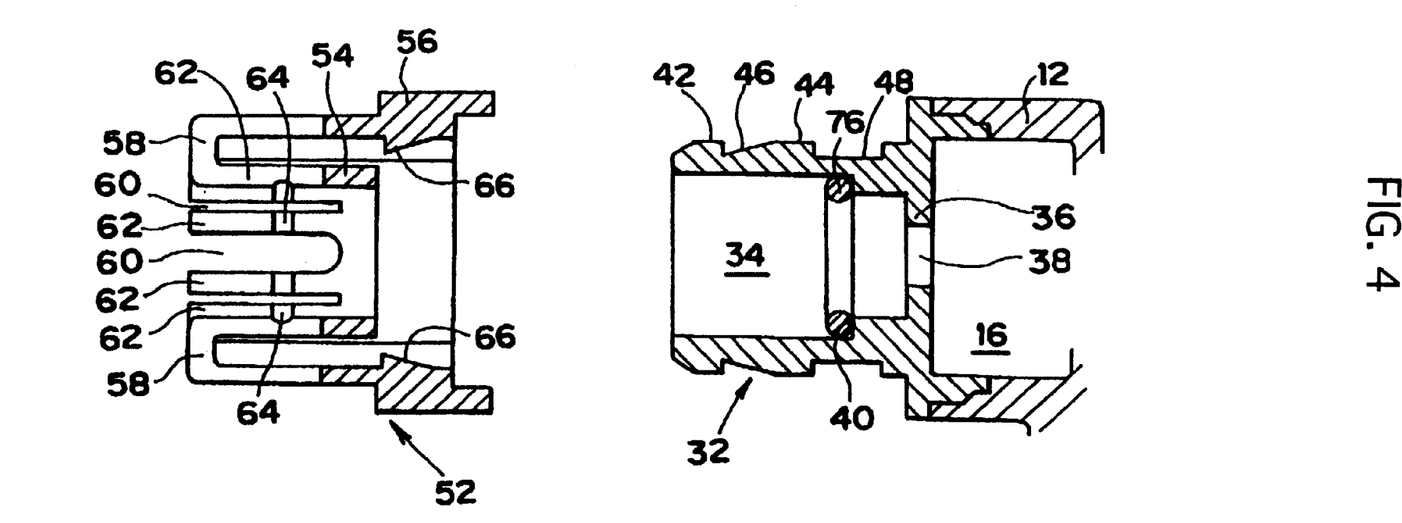
FIG. 4 is a cross-sectional view showing the connecting member used in the present invention with the stopper member attached.

When the housing 12 and the connecting member 32 are separate, the connecting member 32 is fixed to the opening of the gas extraction path 16 using well-known fixing means such as fusing, etc. Alternatively, the connecting member 50 is formed integrally with the housing 12. The inner space 34 of the connecting member 32 and the connecting member 50 communicates with the gas extraction path 16 when the connecting member 32 or the connecting member 50 are fixed to the housing 12. In this state, as shown in FIG. 3, an O-ring 76 is installed within the inner space 34 of the connecting member 32 or connecting member 50 using a jig 74. The O-ring 76 is housed in a position so as to come into contact with the step 40 (refer to FIG. 4), i.e. the O-ring is prevented from entering further by the step 40.

Figure 5:
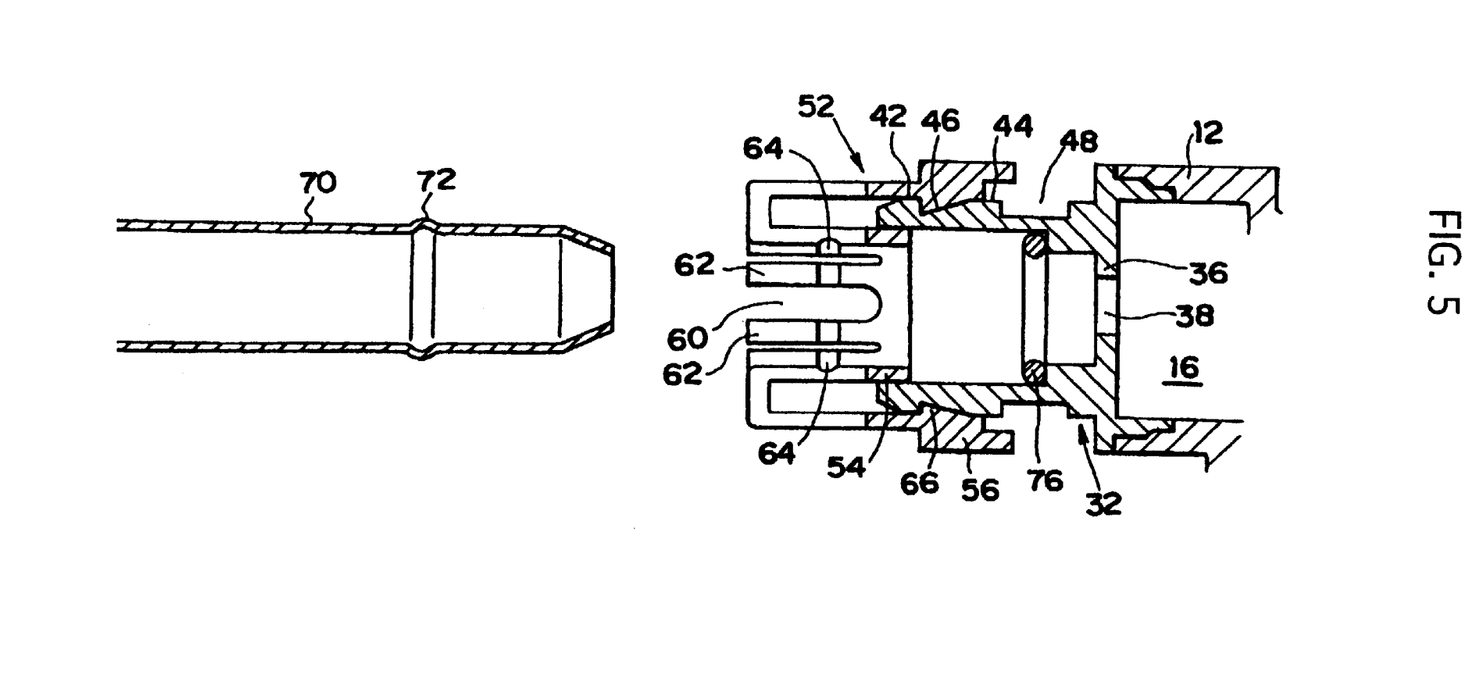
FIG. 5 is a cross-sectional view showing the stopper member used in the present invention with a pipe attached.

After this, a stopper 52 is attached to the connecting member 32 or the connecting member 50 from the side of the free end of the outer member 56. During this time, the outer wall of the inner member 54 of the stopper member 52 fits with the inner wall of the connecting member 32. When the stopper member 52 is then pushed in the direction of the connecting member 32 or connecting member 50, the engaging claws 66 positioned at the inner side near the free end of the outer member 56 come into contact with and then pass the first raised portion 42 of the connecting member 32 or connecting member 50, and then engage with the first recess 46 (FIG. 5). When the engaging claws 66 are engaged with the first recess 46, the stopper member 52 is installed in such a manner as to not come away even when pulled. When the stopper member 52 is then pushed further inwards, the engaging claws 66 of the stopper member 52 can be installed past the second raised portion 44.

As shown in FIG. 5, when the engaging claws 66 of the outer member 56 engage with the first recess 46, at the inner member 54, only locations of the outer wall communicating in the circumferential direction temporarily fit to a shallow depth with the inner wall of the connecting member 32 or the connecting member 50. When the engaging claws 66 of the outer member 56 engage with the first recess 46 of the connecting member 32 or the connecting member 50, the evaporation valve 10 can be supplied by a parts supplier to a manufacturer for assembly in a vehicle, etc.

At the manufacturer, as shown in FIG. 5, the pipe 70 formed with the bulge 72 near one end is inserted into the inner space of the inner member 54 of the stopper member 52. The outer diameter of the bulge 72 of the pipe 70 is set to be larger than the inner diameter of the cylindrical shape formed by the large number of arm sections 62. However, the slits 60 are formed between each of the arm sections 62 and, as shown in FIG. 5, the arm sections 62 do not fit with the inner wall of the connecting member 32. Therefore, when the pipe 70 is inserted into the inner space within the inner member 54, the pipe is inserted while the bulge 72 spreads out the large number of arm sections 62. When the bulge 72 reaches the channels 64 formed in the arm sections 62, the bulge 72 fits in the channels 64 and insertion of the pipe is complete.

In this state, the bulge 72 of the pipe 70 will not come away from the channels 64 of the arm sections 62 of the inner member 54, providing that a large amount of external force is not applied, i.e. the pipe 70 and the arm sections 62 of the inner member 54 are in a temporarily fixed state.

Figure 6:
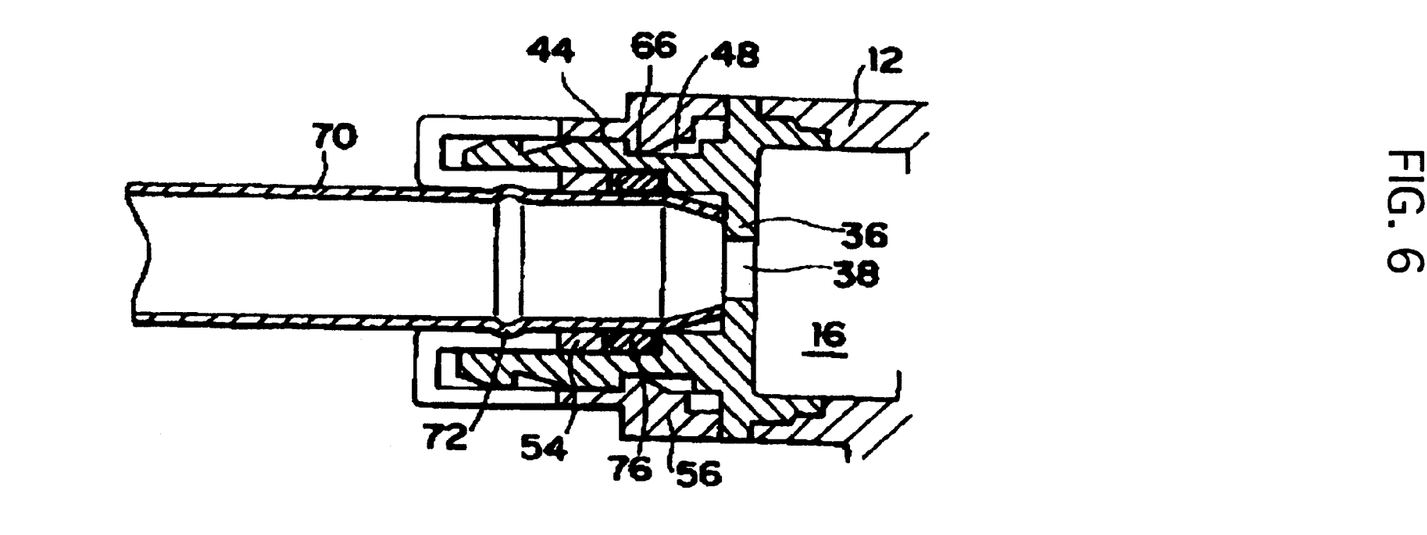
FIG. 6 is a cross-sectional view showing a pipe fixed to the stopper member.

If the pipe 70 is then inserted after this, the pipe 70 and the inner member 54 (stopper 52) are in a temporarily fixed state. The pipe 70 and the stopper member 52 therefore become integrated and move towards the side of the stopper wall 36 of the connecting member 32. As a result of this movement, the engaging claws 66 of the stopper member 52 pass the second raised portion 44 and fit into the second recess 48 (FIG. 6). During this time, the end of the pipe 70 passes through the O-ring 76. When the engaging claws 66 engage with the second recess 48, it is preferable for the end of the pipe 70 to be installed in such a manner as to make firm contact with the stopper wall 36, so that the pipe 70 does not move in the direction of insertion even if pushed in the direction of insertion.

When the engaging claws 66 engage with the second recess 48, installation is such that the second recess 48 and the engaging claws 66 do not disengage even if the stopper member 52 is pulled. The stopper member 52 is therefore not pulled away from the connecting member 32 even if the stopper 52 is subjected to external force.

When the engaging claws 66 of the stopper 52 engage with the second recess 48 of the connecting member 32, the outer wall of the arm sections 62 of the inner member 54 fits with the inner wall of the connecting member 32. The arm sections 62 are therefore no longer opened up towards the outer side. The fitting of the bulge 72 of the pipe 70 into the channels 64 of the arm sections 62 of the inner member 54 is therefore maintained and the pipe 70 does not come away even if pulled away from the stopper 52. The O-ring is sandwiched by the step 40 of the connecting member 32 and the end surface at the side of the proceeding tip of the inner member 54.

When the engaging claws 66 of the stopper 52 engage with the second recess 48 of the connecting member 32, the stopper 52 cannot be drawn away from the connecting member 32 fixed to the housing 12, and the pipe 70 cannot be drawn away from the stopper 52. The pipe 70 will therefore not come away from the housing 12 of the evaporation valve 10.

What is claimed is:

1. A pipe-fastening structure for an evaporation valve having a housing and a gas extraction path formed within the housing, said structure comprising:

a cylindrical connecting member, fixed to the housing, with first engaging means formed at an outer wall and an inner space communicating with the gas extraction path;

a stopper member having a cylindrical inner member and second engaging means engaging with the first engaging means in two stages, closely fitting with the inner and outer walls of the cylindrical connecting member;

a variable member, formed at part of the inner member in a cylindrical shape with a diameter capable of enlargement;

channels formed in the same circumferential direction at the inner wall of the variable member at a position midway in the axial direction;

a pipe for connecting evaporation valves; and a large diameter bulge section formed in the vicinity of an end of the pipe, wherein locations of the inner member other than the variable member fit closely with the cylindrical inner wall of the connecting member and the first and second engaging means undergo first stage engagement, and then the pipe and the stopper member are moved with respect to the connecting member, the variable member fits closely with the inner wall of the connecting member, and the first and second engaging means undergo second stage engagement.

2. The pipe-fastening structure of claim 1, wherein the connecting member is fixed to th e housing using fixing means formed separately from the housing.

3. The pipe-fastening structure of claim 1, wherein the connecting member is formed integrally with the housing.

4. The pipe-fastening structure of claims 1, wherein the variable member comprises a multiplicity of arms and slits formed between the arms.

5. The pipe-fastening structure of claims 1, wherein when the first and second engaging means undergo the first stage engagement and the second stage engagement, engagement is not released even if the stopper member is subjected to external force in a direction opposite to a direction of attachment of the stopper member.

6. The pipe-fastening structure of claims 5, wherein the first engaging means comprises a first raised portion, a first recess, a second raised portion and a second recess, formed in that order in the axial direction at the outer wall of the connecting member, the second engaging means is an engaging claw, and when the first and second engaging means undergo the first stage engagement and the second stage engagement, engagement is not released even if the stopper member is subjected to external force in a direction opposite to a direction of attachment of the stopper member.

7. The pipe-fastening structure of claim 2, wherein the connecting member is formed integrally with the housing.

8. The pipe-fastening structure of claims 2, wherein the variable member comprises a multiplicity of arms and slits formed between the arms.

9. The pipe-fastening structure of claims 2, wherein when the first and second engaging means undergo the first stage engagement and the second stage engagement, engagement is not released even if the stopper member is subjected to external force in a direction opposite to a direction of attachment of the stopper member.

10. The pipe-fastening structure of claims 9, wherein the first engaging means comprises a first raised portion, a first recess, a second raised portion and a second recess, formed in that order in the axial direction at the outer wall of the connecting member, the second engaging means is an engaging claw, and when the first and second engaging means undergo the first stage engagement and the second stage engagement, engagement is not released even if the stopper member is subjected to external force in a direction opposite to a direction of attachment of the stopper member.

11. The pipe-fastening structure of claims 3, wherein the variable member comprises a multiplicity of arms and slits formed between the arms.

12. The pipe-fastening structure of claims 3, wherein when the first and second engaging means undergo the first stage engagement and the second stage engagement, engagement is not released even if the stopper member is subjected to external force in a direction opposite to a direction of attachment of the stopper member.

13. The pipe-fastening structure of claims 12, wherein the first engaging means comprises a first raised portion, a first recess, a second raised portion and a second recess, formed in that order in the axial direction at the outer wall of the connecting member, the second engaging means is an engaging claw, and when the first and second engaging means undergo the first stage engagement and the second stage engagement, engagement is not released even if the stopper member is subjected to external force in a direction opposite to a direction of attachment of the stopper member.

14. The pipe-fastening structure of claims 4, wherein when the first and second engaging means undergo the first stage engagement and the second stage engagement, engagement is not released even if the stopper member is subjected to external force in a direction opposite to a direction of attachment of the stopper member.

15. The pipe-fastening structure of claims 14, wherein the first engaging means comprises a first raised portion, a first recess, a second raised portion and a second recess, formed in that order in the axial direction at the outer wall of the connecting member, the second engaging means is an engaging claw, and when the first and second engaging means undergo the first stage engagement and the second stage engagement, engagement is not released even if the stopper member is subjected to external force in a direction opposite to a direction of attachment of the stopper member.

* * * * *